(12) United States Patent
Magklis et al.

(10) Patent No.: US 11,422,807 B2
(45) Date of Patent: Aug. 23, 2022

(54) TESTING BIT VALUES INSIDE VECTOR ELEMENTS

(71) Applicant: ARM LIMITED, Cambridge (GB)

(72) Inventors: Grigorios Magklis, Cambridge (GB); Nigel John Stephens, Cambridge (GB)

(73) Assignee: ARM LIMITED, Cambridge (GB)

( * ) Notice: Subject to any disclaimer, the term of this patent is extended or adjusted under 35 U.S.C. 154(b) by 0 days.

(21) Appl. No.: 16/629,178

(22) PCT Filed: Jun. 27, 2018

(86) PCT No.: PCT/EP2018/067234
§ 371 (c)(1),
(2) Date: Jan. 7, 2020

(87) PCT Pub. No.: WO2019/011653
PCT Pub. Date: Jan. 17, 2019

(65) Prior Publication Data
US 2020/0225953 A1 Jul. 16, 2020

(30) Foreign Application Priority Data
Jul. 10, 2017 (EP) .................................. 17386023

(51) Int. Cl.
*G06F 9/30* (2018.01)

(52) U.S. Cl.
CPC ...... *G06F 9/30036* (2013.01); *G06F 9/30018* (2013.01); *G06F 9/30021* (2013.01); *G06F 9/30101* (2013.01); *G06F 9/30145* (2013.01)

(58) Field of Classification Search
None
See application file for complete search history.

(56) References Cited

U.S. PATENT DOCUMENTS 5,459,841 A * 10/1995 Flora-Holmquist ......................... G05B 19/042 326/37
5,473,531 A * 12/1995 Flora-Holmquist ......................... G05B 19/042 700/12

(Continued)

FOREIGN PATENT DOCUMENTS

CN 104081336 A * 10/2014 ......... G06F 9/30101
EP 2 584 460 4/2013
(Continued)

OTHER PUBLICATIONS

'SIMD Types: The Vector Type & Operations' by Matthias Kretz, Oct. 10, 2014. (Year: 2014).*

(Continued)

*Primary Examiner* — Steven G Snyder
(74) *Attorney, Agent, or Firm* — Nixon & Vanderhye, P.C.

(57) ABSTRACT

An apparatus and method of operating an apparatus are provided. The apparatus is responsive to a bit-testing instruction which specifies a source vector register and an index to perform a bit-testing procedure on plural elements stored in the source vector register to generate plural result bits. The bit-testing procedure comprises, for each processed element of the plural elements, setting a respective result bit (Continued)

of the plural result bits in dependence on a value of a tested bit at a bit position in the processed element of the source vector register indicated by the index. This bit-testing instruction thus enables increased performance of program code which is required to perform multiple bit tests and can be suitably formulated into a vectorised form.

17 Claims, 7 Drawing Sheets

(56) References Cited

U.S. PATENT DOCUMENTS

| | | | |
|---|---|---|---|
| 5,623,680 A * | 4/1997 | Flora-Holmquist | G05B 19/042 711/220 |
| 7,043,511 B1 * | 5/2006 | Dante | H03K 19/17732 708/230 |
| 7,124,160 B2 * | 10/2006 | Saulsbury | G06F 7/505 708/490 |
| 8,433,883 B2 * | 4/2013 | Greyzck | G06F 9/30018 712/223 |
| 10,445,092 B2 * | 10/2019 | San Adrian | G06F 15/8084 |
| 10,678,541 B2 * | 6/2020 | Forsyth | G06F 9/3818 |
| 10,747,819 B2 * | 8/2020 | Payer | G06F 9/30036 |
| 2002/0035589 A1 * | 3/2002 | Saulsbury | G06F 9/30181 708/700 |
| 2002/0188830 A1 | 12/2002 | Boles et al. | |
| 2003/0034544 A1 * | 2/2003 | May | G06F 15/8023 257/523 |
| 2005/0013293 A1 * | 1/2005 | Sahita | H04L 45/7453 370/389 |
| 2008/0253668 A1 | 10/2008 | Lamb et al. | |
| 2009/0254694 A1 * | 10/2009 | Ehrman | G11C 7/1006 711/100 |
| 2010/0106944 A1 | 4/2010 | Symes et al. | |
| 2010/0318773 A1 * | 12/2010 | Greyzck | G06F 7/02 712/223 |
| 2013/0246757 A1 * | 9/2013 | Bradbury | G06F 9/3001 712/222 |
| 2013/0246759 A1 * | 9/2013 | Bradbury | G06F 9/30185 712/222 |
| 2014/0013076 A1 * | 1/2014 | Ganesh | G06F 9/30036 712/4 |
| 2014/0281371 A1 * | 9/2014 | Thantry | G06F 9/30036 712/7 |
| 2016/0188530 A1 * | 6/2016 | San Adrian | G06F 15/8084 712/7 |
| 2019/0155603 A1 * | 5/2019 | Villmow | G06F 9/3848 |

FOREIGN PATENT DOCUMENTS

| | | | | |
|---|---|---|---|---|
| EP | 2584460 A1 * | 4/2013 | | G06F 9/30101 |
| EP | 2 889 756 | 7/2015 | | |
| GB | 2382673 A * | 6/2003 | | G06F 9/30043 |
| JP | 53-053237 | 5/1978 | | |
| JP | 02-230320 | 9/1990 | | |
| JP | 05-108542 | 4/1993 | | |
| JP | 2000-322408 | 11/2000 | | |
| JP | 2002-073346 | 3/2002 | | |
| JP | 2005-174298 | 6/2005 | | |
| JP | 2014-182802 | 9/2014 | | |
| TW | 201723811 | 7/2017 | | |
| WO | 2017/021681 | 2/2017 | | |

OTHER PUBLICATIONS

'6.49 Using Vector Instructions through Built-in Functions' from gcc.gnu.org archived on Apr. 30, 2016. (Year: 2016).*
IBM Technical Disclosure Bulletin NA8909217 'Means for Updating and Searching Sparse Tables,' Sep. 1, 1989. (Year: 1989).*
Office Action for EP Application No. 17386023.0 dated Feb. 7, 2020, 4 pages.
Robert Bedichek, "Some Efficient Architecture Simulation Techniques", Proceedings of the Winter 1990 USENIX Conference, Jan. 22-26, 1990, 12 pages.
International Search Report and Written Opinion of the ISA for PCT/EP2018/067234 dated Sep. 25, 2018, 12 pages.
Extended European Search Report for EP Application No. 17386023.0 dated May 2, 2018, 6 pages.
Office Action dated Feb. 3, 2021, issued in in EP Application No. 17386023.0 (4 pages).
Office Action issued in IN Application No. 202047004649, dated Mar. 4, 2022, with English Translation 6 pages.
Richard M. Stallman and the GCC Developer Community,"Vector Extensions—Using the GNU Compiler Collection (GCC)", 2010, 666 pages.
Office Action issued in Taiwan Application No. 107122047, dated Dec. 21, 2021, with English Translation 20 pages.
Office Action issued in Japanese Application No. 2019-572555, dated Jun. 10, 2022 with English translation (7 pages).

* cited by examiner

TSTZ   < DESTINATION >, < GOVERNING >, < SOURCE >, INDEX
(TSTNZ)   REGISTER        PREDICATE      VECTOR
                          REGISTER       REGISTER

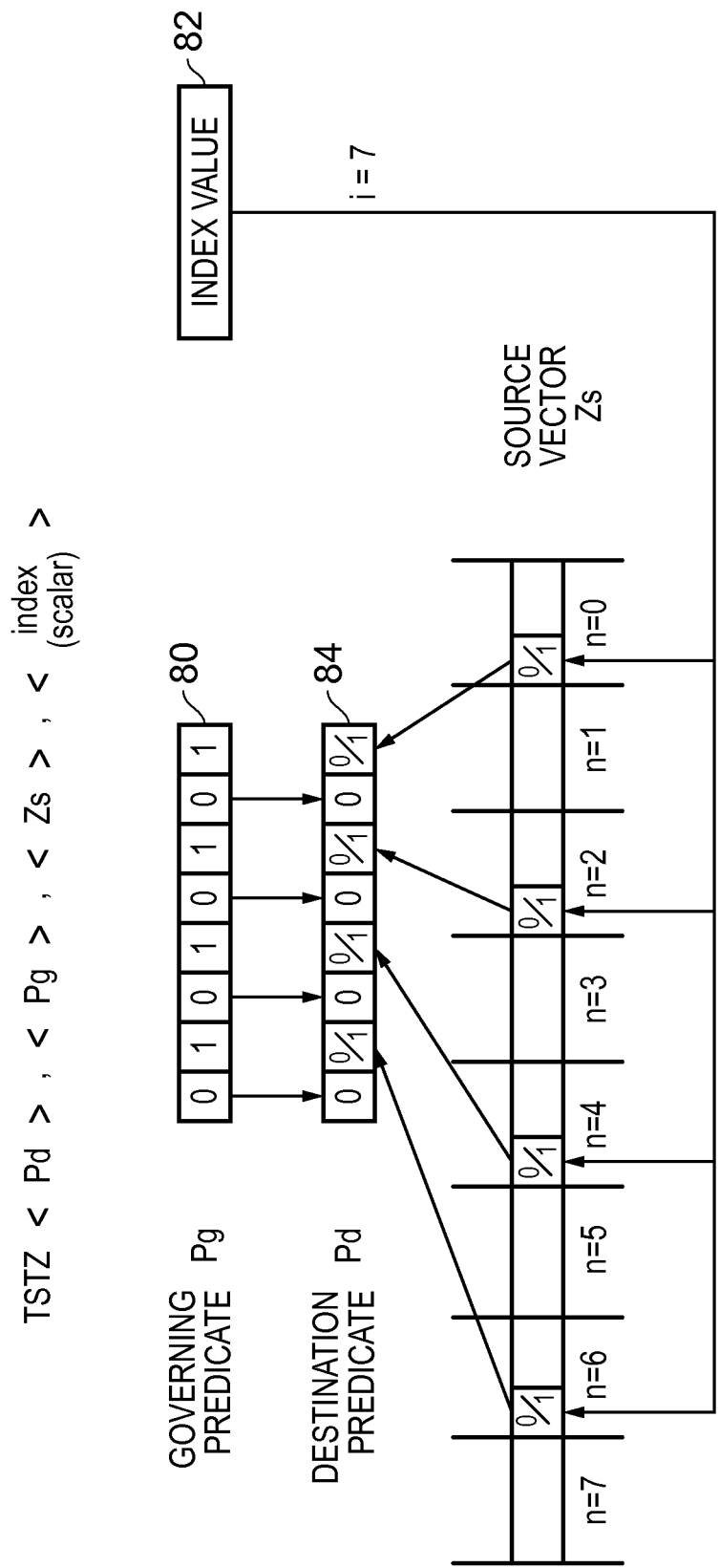

TESTING BIT VALUES INSIDE VECTOR ELEMENTS

This application is the U.S. national phase of International Application No. PCT/EP2018/067234 filed Jun. 27, 2018 which designated the U.S. and claims priority to EP Application No. 17386023.0 filed Jul. 10, 2017, the entire contents of each of which are hereby incorporated by reference.

TECHNICAL FIELD

The present disclosure relates to a data processing apparatus. More particularly it relates to the testing of bit values inside vector elements processed by the data processing apparatus.

BACKGROUND

When a data processing apparatus is performing data processing it may be useful for the data processing apparatus to test whether a specified bit of an input value is set or not. In this manner that bit of the input value can be used by the programmer to control the operation of the data processing apparatus, for example to switch certain functionality on or off, to modify certain data processing behaviour, to include or exclude certain specified input data for processing, and so on.

SUMMARY

In one example embodiment there is an apparatus comprising instruction decoding circuitry to decode instructions and generate control signals in dependence on the instructions; and data processing circuitry to perform data processing operations in response to the control signals generated by the instruction decoding circuitry, wherein the instruction decoding circuitry is responsive to a bit-testing instruction specifying a source vector register and an index to cause the data processing circuitry to perform a bit-testing procedure on plural elements stored in the source vector register to generate plural result bits, the bit-testing procedure comprising for each processed element of the plural elements: setting a respective result bit of the plural result bits in dependence on a value of a tested bit at a bit position in the processed element of the source vector register indicated by the index.

In another example embodiment there is a method of operating a data processing apparatus comprising decoding instructions and generating control signals in dependence on the instructions; performing data processing operations in response to the control signals generated; and in response to a bit-testing instruction specifying a source vector register and an index causing performance of a bit-testing procedure on plural elements stored in the source vector register to generate plural result bits, wherein the bit-testing procedure comprises for each processed element of the plural elements: setting a respective result bit of the plural result bits in dependence on a value of a tested bit at a bit position in the processed element of the source vector register indicated by the index.

In another example embodiment there is an apparatus comprising means for decoding instructions and generating control signals in dependence on the instructions; means for performing data processing operations in response to the control signals generated; and means for causing, in response to a bit-testing instruction specifying a source vector register and an index, performance of a bit-testing procedure on plural elements stored in the source vector register to generate plural result bits, wherein the bit-testing procedure comprises for each processed element of the plural elements: setting a respective result bit of the plural result bits in dependence on a value of a tested bit at a bit position in the processed element of the source vector register indicated by the index.

In another example embodiment there is a computer program for controlling a host data processing apparatus to provide an instruction execution environment comprising: instruction decoding program logic to decode instructions and generate control signals in dependence on the instructions; and data processing program logic to perform data processing operations in response to the control signals generated by the instruction decoding program logic, wherein the instruction decoding program logic is responsive to a bit-testing instruction specifying a source vector data structure and an index to cause the data processing program logic to: perform a bit-testing procedure on plural elements stored in the source vector data structure to generate plural result bits, the bit-testing procedure comprising for each processed element of the plural elements: setting a respective result bit of the plural result bits in dependence on a value of a tested bit at a bit position in the processed element of the source vector data structure indicated by the index.

BRIEF DESCRIPTION OF THE DRAWINGS

The present techniques will be described further, by way of example only, with reference to embodiments thereof as illustrated in the accompanying drawings, in which:

FIG. 4A shows an example bit-testing instruction and the corresponding data processing circuitry to carry out a bit-testing procedure with reference to a scalar index value in one embodiment;

DESCRIPTION OF EMBODIMENTS

Figure 1:
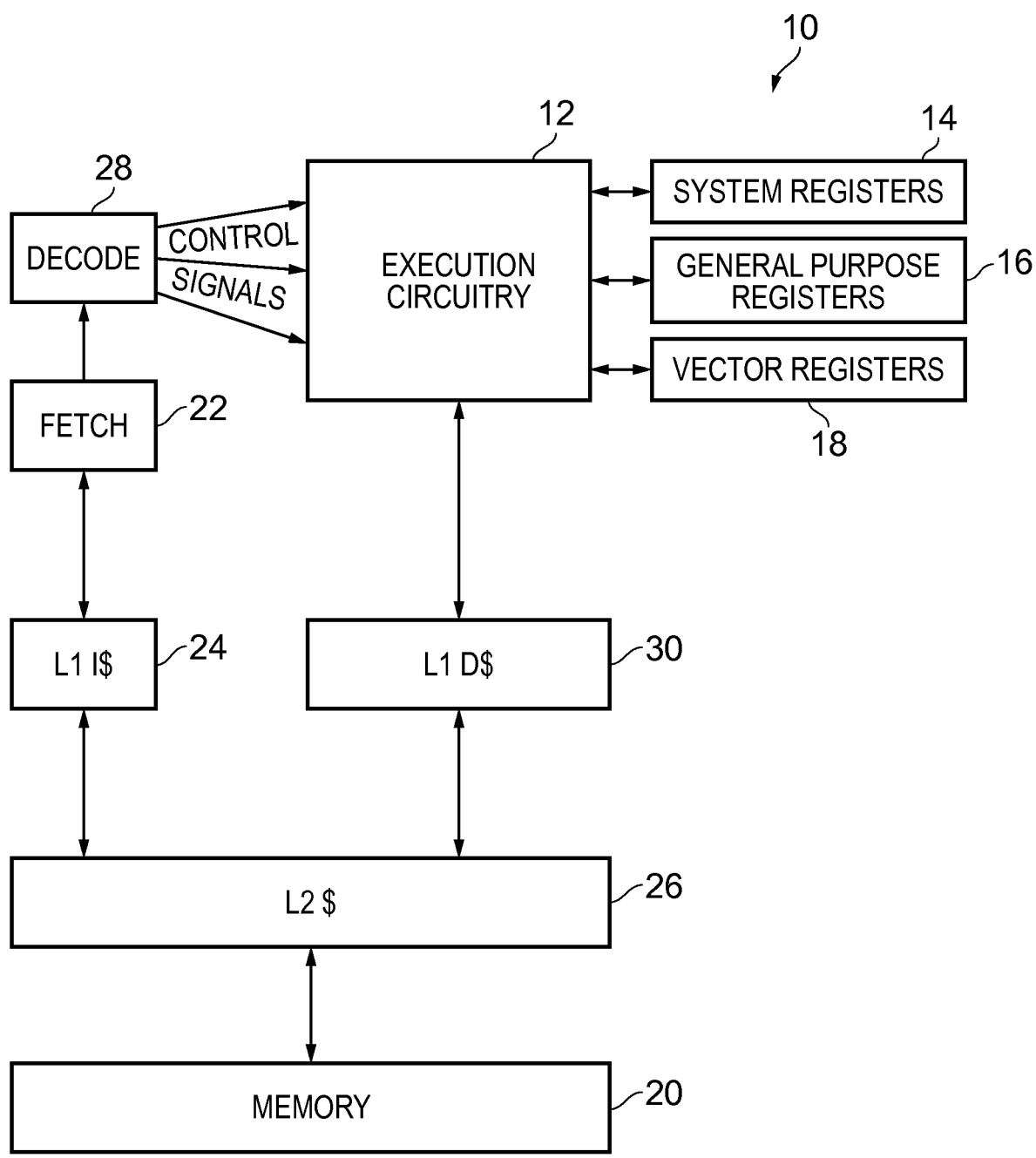
FIG. 1 schematically illustrates a data processing apparatus in one embodiment.

At least some embodiments provide an apparatus comprising instruction decoding circuitry to decode instructions and generate control signals in dependence on the instructions; and data processing circuitry to perform data processing operations in response to the control signals generated by the instruction decoding circuitry, wherein the instruction decoding circuitry is responsive to a bit-testing instruction specifying a source vector register and an index to cause the data processing circuitry to: perform a bit-testing procedure on plural elements stored in the source vector register to generate plural result bits, the bit-testing procedure comprising for each processed element of the plural elements: setting a respective result bit of the plural result bits in dependence on a value of a tested bit at a bit position in the processed element of the source vector register indicated by the index.

The bit-testing instruction, and the corresponding supporting circuitry to execute it, thus provide the programmer with the ability to perform a bit-test on multiple bits in parallel, by means of an approach in which the respective bits to be tested are to be found in respective elements of a source vector. A source vector, specified by reference to a vector register which hold it, thus forms one input to the bit-testing procedure and an index specified in the bit-testing instruction enables the programmer to define which bit of an element in the source vector will be subjected to the bit-testing. The result of the bit-testing procedure executed in response to the bit-testing instruction is a set of result bits (one result bit corresponding to each processed element of the plural elements of the source vector subjected to the bit-testing procedure) and each result bit of the plural result bits is set in dependence on the value of the corresponding tested bit. It will be understood therefore in the context of bit testing that the result bit could be set to match the tested bit or conversely the result bit could be set to be the complement of (inverse of) the tested bit, this essentially being an implementation choice. Provision of this bit-testing instruction thus enables increased performance of any program code which is required to perform multiple bit tests and can be suitably formulated into a vectorised form. Essentially, a parallelized approach is provided instead of a linear approach.

Depending on the capabilities and the configuration of the data processing circuitry, not all of the elements of the source vector register may be subjected to the bit-testing procedure. In other words, only a strict subset of the elements of the source vector register may be subjected to the bit-testing procedure. However, in some embodiments the plural elements subjected to the bit-testing procedure comprise all elements of the source vector register.

The programmer may be provided with the ability to specify which elements of the source vector register are subjected to the bit-testing procedure. Accordingly in some embodiments in the bit-testing procedure an element of the plural elements is subjected to the bit-testing procedure as the processed element when a respective predicate bit of a set of governing predicate bit values has a first predetermined value. In other words, the programmer sets the corresponding predicate bit to the first predetermined value (e.g. 1) in order to cause the bit-testing procedure to be carried out on the corresponding element of the source vector.

Depending on the configuration and capabilities of the data processing circuitry the set of governing predicate bit values could vary in length with respect to the number of elements in the source vector register, for example only corresponding to a strict subset of the elements of the source vector register, but in some embodiments a number of values in the set of governing predicate bit values matches a number of elements in the source vector register.

The set of governing predicate bit values could be provided in a variety of ways, but in some embodiments the bit-testing instruction specifies a set of governing predicate bit values and furthermore in some embodiments the bit-testing instruction specifies a register holding a set of governing predicate bit values. Accordingly for example by setting the governing predicate bit values in the specified register the programmer can determine which of the elements of the source vector are subjected to the bit-testing procedure.

The bit-testing procedure may be variously configured when such a set of governing predicate bit values are provided, but in some embodiments in the bit-testing procedure, when the respective predicate bit of the set of governing predicate bit values does not have the first predetermined value, the respective result bit of the plural result bits is set to a second predetermined value. It will be clearly understood that the choice of the first and second predetermined values are arbitrary implementation choices, but in some embodiments when a governing predicate bit value is 0, the corresponding respective result bit is also set to 0. Thus, conversely when the predicate bit is set to 1, the corresponding element of the source vector register is processed as part of the bit-testing procedure, and the tested bit of the processed element at the bit position indicated by the index determines the corresponding result bit.

The data processing circuitry may make use of the plural result bits in a variety of ways, but in some embodiments the data processing circuitry is arranged to store the plural result bits into a result register. This result register may be known by default, or in some embodiments the result register is specified in the bit-testing instruction. Accordingly the programmer is given the ability to specify a register into which the plural result bits should be stored.

Generally the number of the plural result bits may vary with respect to the plural elements of the source vector, for example depending on the capabilities and the configuration of the data processing circuitry the number of plural result bits may be less than the number of elements in the source vector register, but in some embodiments a count of the plural result bits matches a count of the plural elements stored in the source vector register.

The respective result bit of the plural result bits is set in dependence on the value of the tested bit at the bit position in the processed element of the source vector register indicated by the index, and it will be appreciated that the apparatus may be set up to do this setting in complementary ways. In other words, in some embodiments in the bit-testing procedure the respective result bit of the plural result bits is set to match the value of the tested bit. Conversely in other embodiments in the bit-testing procedure the respective result bit of the plural result bits is set not to match the value of the tested bit. Indeed, these two variants may be provided as two distinct bit-testing instructions and these are referred to herein as a TSTZ ("test zero") and TSTNZ ("test non-zero").

Moreover, an apparatus according to the present techniques may be provided which will respond to both types of bit-testing instruction, thus giving the programmer the choice of testing for zero-set bits and to test for non-zero-set bits and accordingly in some embodiments the instruction decoding circuitry is responsive to a further bit-testing instruction, which causes the data processing circuitry to perform a further bit-testing procedure comprising setting a further respective result bit of further plural result bits not to match a value of a further tested bit. In other words the programmer can use the bit-testing instruction, wherein result bits are set to match the value of tested bits, and subsequently use the further bit-testing instruction in which the result bits are set not to match the tested bits.

Conversely in some embodiments the instruction decoding circuitry is responsive to a further bit-testing instruction, which causes the data processing circuitry to perform a further bit-testing procedure comprising setting a further respective result bit of further plural result bits to match a value of a further tested bit. Accordingly the programmer can use a bit-testing instruction which causes result bits to be set not to match the value of the tested bits and subsequently use the further bit testing instruction which causes result bits to match the tested bits. In the language of the specific embodiments discussed herein, the programmer can use both the TSTZ instruction and the TSTNZ instruction, however defined, in either order.

The index may be variously defined, but in some embodiments the index is an immediate value specified in the bit-testing instruction. Alternatively, the bit-testing instruction may specify a scalar index register and in such embodiments the index is a scalar value stored in the scalar index register specified in the bit-testing instruction. In yet other embodiments, the bit-testing instruction may specify a vector index register holding plural index values, and in the bit-testing procedure, for each processed element of the plural elements, the index is given by a respective index value of the plural index values. This means that unlike in the scalar example the programmer can use a different index value for each processed element of the plural elements of the source vector and thus bit-test any bit of a given element.

At least some embodiments provide a method of decoding instructions and generating control signals in dependence on the instructions; performing data processing operations in response to the control signals generated; and in response to a bit-testing instruction specifying a source vector register and an index causing performance of a bit-testing procedure on plural elements stored in the source vector register to generate plural result bits, wherein the bit-testing procedure comprises for each processed element of the plural elements: setting a respective result bit of the plural result bits in dependence on a value of a tested bit at a bit position in the processed element of the source vector register indicated by the index.

At least some embodiment provide an apparatus comprising: means for decoding instructions and generating control signals in dependence on the instructions; means for performing data processing operations in response to the control signals generated; and means for causing, in response to a bit-testing instruction specifying a source vector register and an index, performance of a bit-testing procedure on plural elements stored in the source vector register to generate plural result bits, wherein the bit-testing procedure comprises for each processed element of the plural elements: setting a respective result bit of the plural result bits in dependence on a value of a tested bit at a bit position in the processed element of the source vector register indicated by the index.

In another example embodiment there is a computer program for controlling a host data processing apparatus to provide an instruction execution environment comprising: instruction decoding program logic to decode instructions and generate control signals in dependence on the instructions; and data processing program logic to perform data processing operations in response to the control signals generated by the instruction decoding program logic, wherein the instruction decoding program logic is responsive to a bit-testing instruction specifying a source vector data structure and an index to cause the data processing program logic to: perform a bit-testing procedure on plural elements stored in the source vector data structure to generate plural result bits, the bit-testing procedure comprising for each processed element of the plural elements: setting a respective result bit of the plural result bits in dependence on a value of a tested bit at a bit position in the processed element of the source vector data structure indicated by the index.

At least some embodiments provide a computer-readable storage medium storing the computer program according to the embodiment mentioned above. The program may be stored in a non-transient fashion.

Some particular embodiments are now described with reference to the figures.

FIG. 1 schematically illustrates a data processing apparatus in one embodiment. The general configuration of the data processing apparatus 10 will be familiar to one of ordinary skill in the art, and detailed description of the components which are not of particular relevance to the present techniques are dispensed with herein for brevity. Schematically, as shown in FIG. 1, the data processing apparatus 10 comprises execution circuitry 12 with associated system registers 14, general purpose registers 16, and vector registers 18. The execution circuitry 12 makes use of these registers in carrying out its data processing operations. The data processing operations which the execution circuitry 12 carries out are defined by a sequence of instructions retrieved from memory 20 by the operation of the fetch circuitry 22. In retrieving the instructions from the memory 20 the instructions may be temporarily cached in either or both of the level 1 instruction cache 24 and the unified level 2 cache 26. Instructions fetched by the fetch circuitry 22 in this manner are passed to the decoding circuitry 28 which generates control signals for the execution circuitry 12 on the basis of the instructions retrieved and the particular instruction parameters they carry. The execution circuitry 12 performs the data processing operations, as mentioned above, with respect to the registers 14, 16 and 18, and also, when required, by retrieving data items from the memory 20 and writing processed data items back to the memory 20. As in the case of the instructions, data items accessed in the memory 20 by the execution circuitry 12 are similarly accessed via means of a cache hierarchy, namely the level 1 data cache 30 and the unified level 2 cache 26. Further detail of the execution circuitry 12 is now given with respect to various embodiments, with reference to the following figures.

Figure 2:
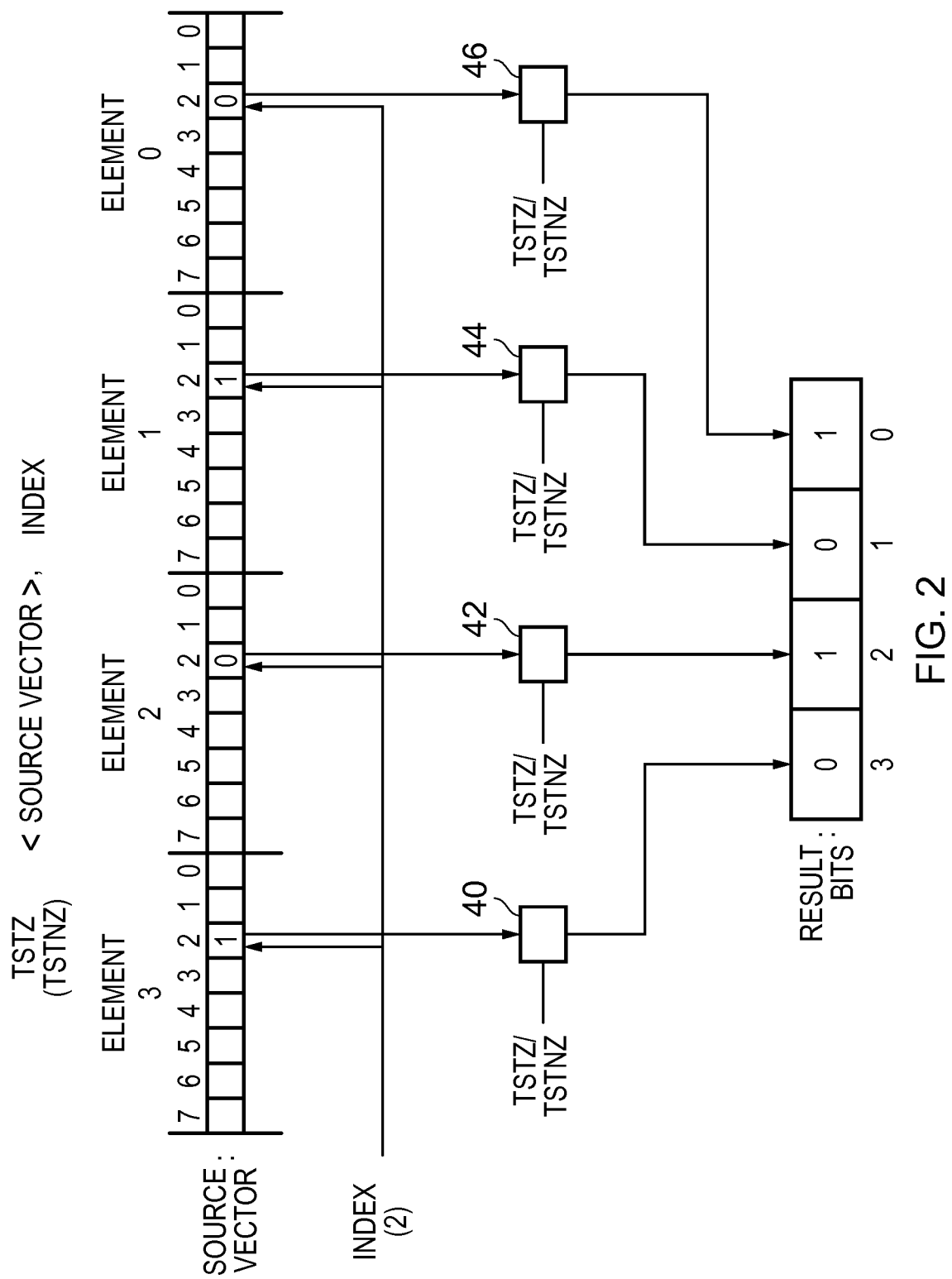
FIG. 2 schematically illustrates data processing circuitry which performs a bit testing procedure on elements of a source vector in one embodiment.

FIG. 2 schematically illustrates the configuration of part of the execution circuitry 12 in one embodiment which is provided to execute the bit-testing procedure initiated by a bit-testing instruction. The bit-testing instruction is shown in the upper part of FIG. 2 in two variants, namely TSTZ and TSTNZ. As shown, these instructions specify a source vector (register) and an index value. In this example the index value is an immediate value. The index value, which in the illustrated example has the immediate value of 2, causes the data processing circuitry to access the respective bits at bit position 2 in each element of the source vector. Accordingly, in the example shown where the source vector comprises four elements each comprising 8 bits this causes the data processing circuitry to access the third bit of each element (at bit position 2). These bits are passed to the comparators 40, 42, 44, and 46. Each of these comparators has a second input which is a binary input indicating whether the bit-testing instruction is TSTZ or TSTNZ. This binary input inverts the bit-testing performed by each comparator, such that for the TSTZ instruction the comparator generates the complement of the tested bit at the indexed bit position in the corresponding element of the source vector, whereas when the instruction is TSTNZ the respective comparator causes the result bit to match the tested bit at the indexed bit position in the corresponding element of the source vector. The example values shown in FIG. 2 are subjected to the TSTZ instruction and accordingly the comparators invert the set of four tested bits from the source vector to create the set of result bits.

Figures 3A, 3B:
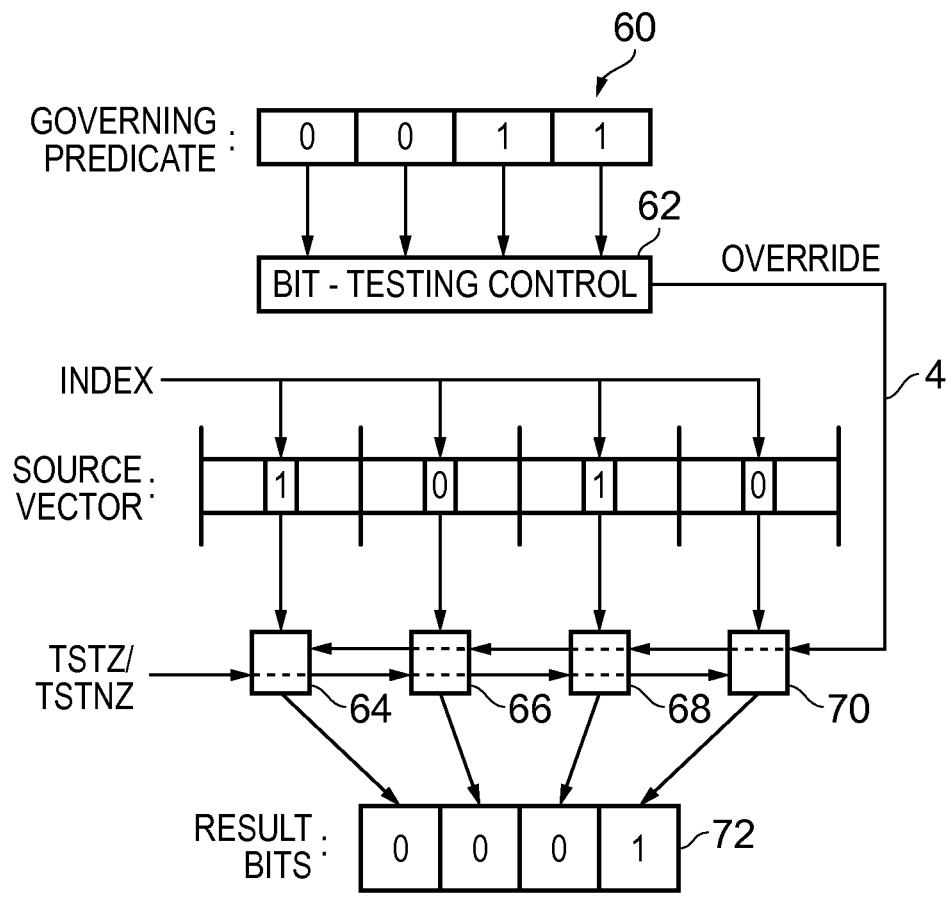
FIG. 3A schematically illustrates data processing circuitry which performs a bit testing procedure on elements of a source vector with reference to a governing predicate value in one embodiment.
FIG. 3B shows two example bit-testing instructions corresponding to the embodiment shown in FIG. 3A.

FIG. 3A schematically illustrates the relevant components of the data processing circuitry in a further example embodiment, wherein here the bit-testing procedure is carried out in further dependence on the content of a set of governing predicate bit values. A corresponding pair of bit-testing instructions, also called TSTZ and TSTNZ are shown in FIG. 3B. The respective bits of the set of governing predicate bit values, shown as item 60 in FIG. 3A determine whether a particular element of the source vector is subjected to the bit-testing of the bit-testing procedure or not. In the example shown, only the elements of the source vector for which the corresponding bit of the set of governing predicate bit values is set to 1 are subjected to this bit-testing. To implement this the bit-testing control circuitry 62 receives the set of governing predicate bit values 60 and generates a set of override signals which control the operation of the bit-testing comparators 64, 66, 68, and 70. As in the example of FIG. 2, these comparators receive the corresponding bit to be tested identified by the index value from the respected element of the source vector and are also controlled by the binary TSTZ/TSTNZ input. A set of result bits 72 is thus generated by the comparators. Accordingly, in the example of FIG. 3A, where only the two least significant bits of the governing predicate 60 are set, the two most significant bits of the set of result bits are automatically set to 0, whilst the two least significant bits of the set of result bits 72 are set by the comparators 68 and 70, in dependence on the respective bits which they test. This is a TSTZ instruction being executed in the example of FIG. 3A and the tested bits are therefore inverted to generate the two least significant bits of the set of result bits 72 as "0" and "1". As can be seen in the example shown in FIG. 3B the TSTZ and TSTNZ instructions in this example specify a source vector register and an immediate index value as in the example of FIG. 2, but here further specify a governing predicate register and a destination register. Accordingly the set of governing predicate bit values 60 is retrieved from the specified governing predicate register, whilst the set of result bits 72 is written into the specified destination register. It will be appreciated that there is no significance to the fact that the instruction of FIG. 3B additionally specifies both the destination register and the governing predicate register with respect to the example of FIG. 2, and in other example embodiments the bit-testing instruction might specify only one of these in addition to the source register and the index.

FIG. 4A shows an example in which a TSTZ instruction specifies a destination register, a governing predicate register, a source vector register, an index (scalar) register. Accordingly, the data processing circuitry which carries out the corresponding bit-testing procedure retrieves the set of governing predicate bit values 80 from the specified register Pg and the index value 82 from the specified index register (in this example the index value being 7). Accordingly, in the respective elements of the source vector Zs the $8^{th}$ bit of each (i=7) is accessed and tested when the corresponding bit of the governing predicate 80 is set. For simplicity of illustration an abbreviated configuration is shown in FIG. 4A wherein an arrow leads directly from the tested bits of the source vector Zs to the respective result bit of the destination predicate 84. In practice these arrows are implemented via a set of comparators such as those shown in the example of FIG. 3A, wherein these are controlled by a respective bit of the governing predicate 80 and also by a binary value indicating whether the instruction is TSTZ or TSTNZ. In the example of FIG. 4A where the instruction is TSTZ the tested bits are inverted to provide the corresponding bits of the destination predicate 84 (this being illustrated in FIG. 4A by the notation: source bit (0/1) goes to result bit (1/0)).

Figure 4B:
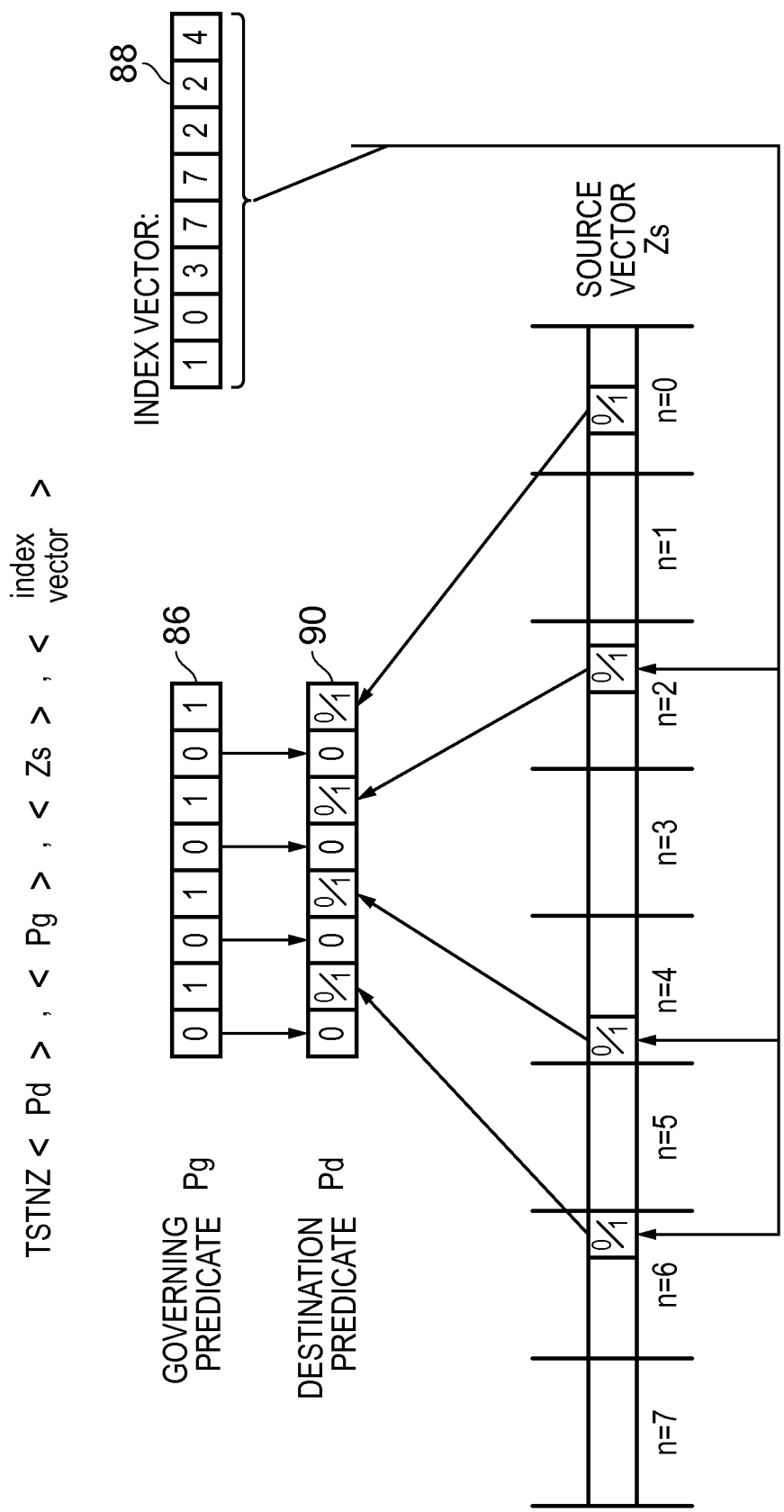
FIG. 4B shows an example bit-testing instruction and the corresponding data processing circuitry to carry out a bit-testing procedure on elements of a source vector with reference to specific index values for each element given by an index vector in one embodiment.

Turning to FIG. 4B an example of a TSTNZ instruction is given which also specifies a destination result register, a governing predicate register and a source vector register, and in this example specifies an index vector register. Accordingly, whilst the governing predicate 86 again selects the elements of the source vector Zs which are to be subjected to the bit-testing procedure, which bit is tested in each tested element is individually specified by the index given in the corresponding element of the index vector 88. Thus, in the example given in FIG. 4B it can be seen that bit position 4 is tested in element 0, bit position 2 is tested in element 2, bit position 7 is tested in element 4, and bit position 0 is tested in element 6. No bit is tested in elements 1, 3, 5, and 7 since the corresponding bits in the governing predicate 86 are set to 0 and accordingly the corresponding bits in the destination of predicate 90 are set to 0.

The example given in FIG. 4B is that of a TSTNZ instruction and therefore the tested bits of the source vector are effectively copied into the corresponding bits of the destination predicate 90 (this being illustrated in FIG. 4B by the notation: source bit (0/1) goes to result bit (0/1)). As in the case of FIG. 4A, the illustration of FIG. 4B is shown for clarity in abbreviated form with an arrow merely leading from the tested bit of the respective element of the source vector Zs to the corresponding bit position of the destination predicate 90. As before, in practice these are implemented via a set of comparators which receive the input bit to be tested and are controlled by a binary input indicating whether the instruction is TSTZ or TSTNZ.

A further variation is applicable to any of the example embodiments described above, namely one in which the bit-testing instruction may further modify any of its specified registers with a size specifier indicating a size interpretation for the content of that register. This may be written as follows for example TSTZ<Pd>.<T>, <Pg>.<T>,<Zs>.<T>, index. This size specifier may for example be encoded in a compact manner in the instruction such as one in which: 00=byte length (B); 01=half word length (H); 10=single word length (S); and 11=double word length (D).

The use of this size specifier <T> enables the programmer to specify the size of the data value in each element of the respective vector of elements. Accordingly, whilst in the absence of this size specifier, or indeed if the size specifier has value which matches the default, then a default interpretation of the elements of the register may be used, for example "S", single word length. If however, the value of <T> specified in the instruction, then the specified size of each vector element is used. Further variations on this functionality are also possible for any of the above described example embodiments, in which the size specifier is itself given by a register and the data processing circuitry accesses that specified size specifying register in order to extract the required size value.

Figure 5:
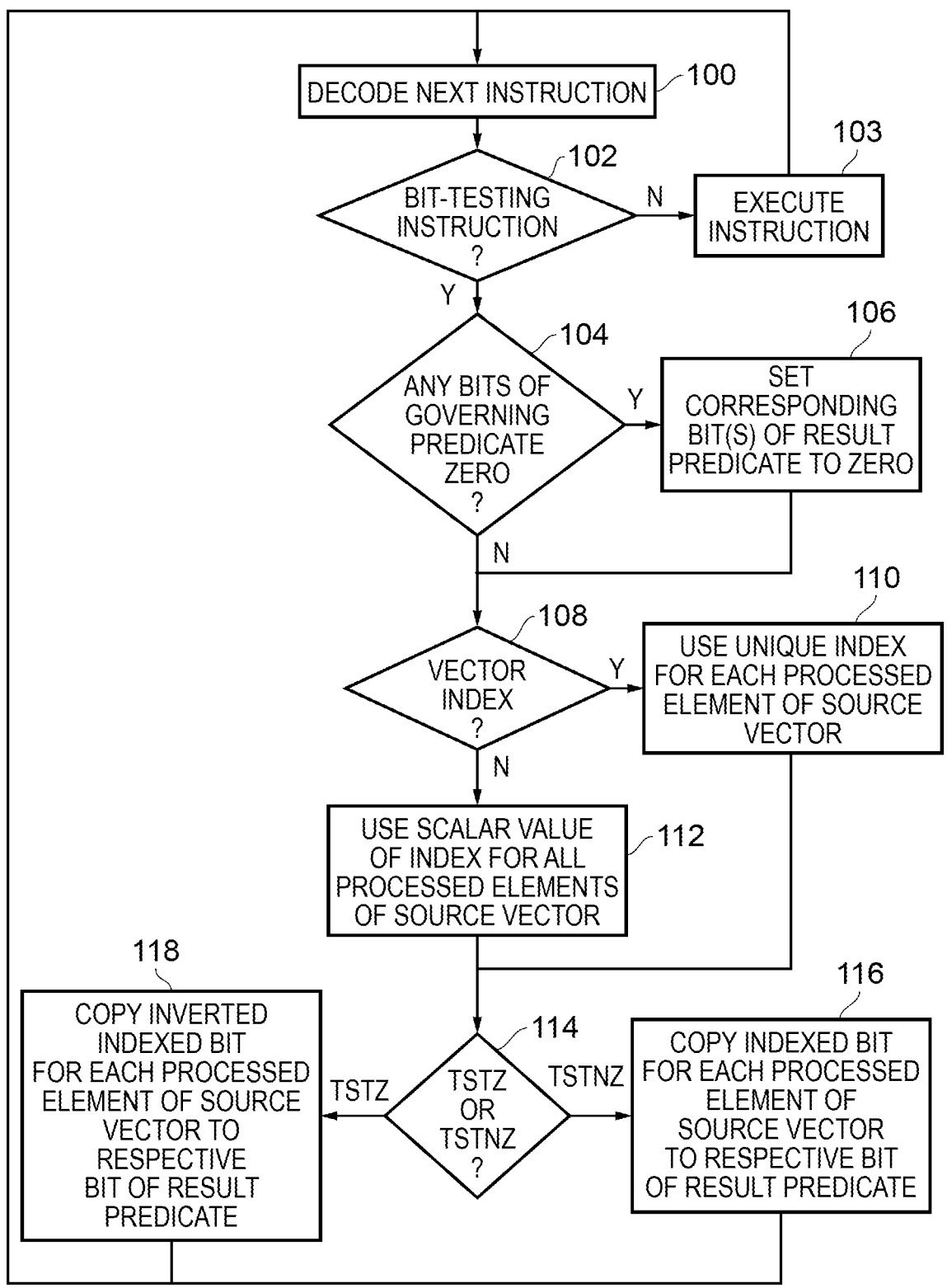
FIG. 5 shows a sequence of steps which are taken when carrying out the method of one embodiment.

FIG. 5 shows a sequence of steps which are carried out according to the method of one embodiment. The flow can be considered to begin at step 100 at which the instruction decoding circuitry decodes the next instruction in the sequence of instructions provided to the apparatus. For simplicity in this figure it is assumed that there is always another instruction to be decoded. At step 102 it is determined if this is a bit-testing instruction and if it is not then this instruction is merely executed at step 103 in the usual fashion for this instruction and the flow returns to step 100 (since only the novel bit-testing instructions are of interest here). For a bit-testing instruction the flow proceeds from step 102 to step 104 where it is determined if any bits of a governing predicate are set to 0. This being the case the flow proceeds via step 106 where the corresponding bit or bits of the result predicate are also set to 0. Then at step 108 it is determined if the bit-testing instruction has specified a vector (as opposed to an immediate or scalar register defined) index. If it has then the flow proceeds via step 110 where a unique index for each processed element of the source vector is used, taken from the corresponding element of the vector index. Otherwise, at step 112 the scalar value of the index (either provided in a scalar register or as an immediate value in the instruction) is used for all processed elements of the source vector. Next at step 144 it is determined whether this is a TSTZ or TSTNZ instruction. For a TSTNZ instruction the flow proceeds to step 116 where the index bit for each processed element of the source vector is copied to the respective bit of the result predicate. Alternatively, in the case that this a TSTZ instruction, the flow proceeds via step 118 at which an inverted index bit for each processed element of the source vector is copied to the respective bit of the result predicate. Execution of this bit-testing instruction is then complete and the flow returns to step 100.

Figure 6:
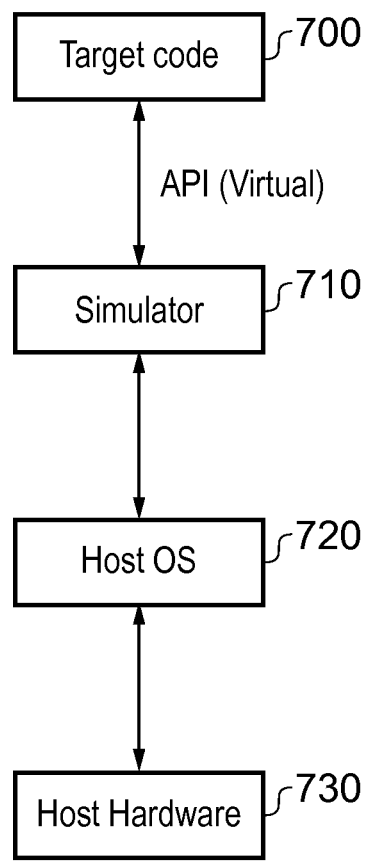
FIG. 6 schematically illustrates the components of system which provides a simulator implementation in one embodiment.

FIG. 6 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 730, optionally running a host operating system 720, supporting the simulator program 710. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 730), some simulated embodiments may make use of the host hardware, where suitable.

The simulator program 710 may be stored on a computer-readable storage medium (which may be a non-transitory medium), and provides a program interface (instruction execution environment) to the target code 700 which is the same as the application program interface of the hardware architecture being modelled by the simulator program 710. Thus, the program instructions of the target code 700, including the bit-testing instructions described above, may be executed from within the instruction execution environment using the simulator program 710, so that a host computer 730 which does not actually have the hardware features of the apparatus discussed above can emulate these features.

In brief overall summary, an apparatus and method of operating an apparatus are provided. The apparatus is responsive to a bit-testing instruction which specifies a source vector register and an index to perform a bit-testing procedure on plural elements stored in the source vector register to generate plural result bits. The bit-testing procedure comprises, for each processed element of the plural elements, setting a respective result bit of the plural result bits in dependence on a value of a tested bit at a bit position in the processed element of the source vector register indicated by the index. This bit-testing instruction thus enables increased performance of program code which is required to perform multiple bit tests and can be suitably formulated into a vectorised form.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:
1. An apparatus comprising:
  instruction decoding circuitry to decode instructions and generate control signals in dependence on the instructions; and
  data processing circuitry to perform data processing operations in response to the control signals generated by the instruction decoding circuitry, wherein the instruction decoding circuitry is responsive to a bit-testing instruction specifying a source vector register and an index to cause the data processing circuitry to:

perform a bit-testing procedure on plural elements stored in the source vector register to generate plural result bits, the bit-testing procedure comprising for each processed element of the plural elements:

setting a respective result bit of the plural result bits in dependence on a value of a tested bit at a bit position in the processed element of the source vector register indicated by the index, wherein in the bit-testing procedure an element of the plural elements is subjected to the bit-testing procedure as the processed element when a respective predicate bit of a set of governing predicate bit values has a first predetermined value, and wherein in the bit-testing procedure, when the respective predicate bit of the set of governing predicate bit values does not have the first predetermined value, the respective result bit of the plural result bits is set to a second predetermined value.

2. The apparatus as claimed in claim 1, wherein the plural elements subjected to the bit-testing procedure comprise all elements of the source vector register.

3. The apparatus as claimed in claim 1, wherein a number of values in the set of governing predicate bit values matches a number of elements in the source vector register.

4. The apparatus as claimed in claim 1, wherein the bit-testing instruction specifies the set of governing predicate bit values.

5. The apparatus as claimed in claim 4, wherein the bit-testing instruction specifies a register holding the set of governing predicate bit values.

6. The apparatus as claimed in claim 1, wherein the data processing circuitry is arranged to store the plural result bits into a result register.

7. The apparatus as claimed in claim 6, wherein the result register is specified in the bit-testing instruction.

8. The apparatus as claimed in claim 1, wherein a count of the plural result bits matches a count of the plural elements stored in the source vector register.

9. The apparatus as claimed in claim 1, wherein in the bit-testing procedure the respective result bit of the plural result bits is set to match the value of the tested bit.

10. The apparatus as claimed in claim 1, wherein in the bit-testing procedure the respective result bit of the plural result bits is set not to match the value of the tested bit.

11. The apparatus as claimed in claim 9, wherein the instruction decoding circuitry is responsive to a further bit-testing instruction, which causes the data processing circuitry to perform a further bit-testing procedure comprising setting a further respective result bit of further plural result bits not to match a value of a further tested bit.

12. The apparatus as claimed in claim 10, wherein the instruction decoding circuitry is responsive to a further bit-testing instruction, which causes the data processing circuitry to perform a further bit-testing procedure comprising setting a further respective result bit of further plural result bits to match a value of a further tested bit.

13. The apparatus as claimed in claim 1, wherein the index is an immediate value in the bit-testing instruction.

14. The apparatus as claimed in claim 1, wherein the index is a scalar value stored in a scalar index register specified in the bit-testing instruction.

15. The apparatus as claimed in claim 1, wherein the bit-testing instruction specifies a vector index register holding plural index values, and in the bit-testing procedure, for each processed element of the plural elements, the index is given by a respective index value of the plural index values.

16. An method of operating a data processing apparatus comprising:

decoding instructions and generating control signals in dependence on the instructions;

performing data processing operations in response to the control signals generated; and in response to a bit-testing instruction specifying a source vector register and an index causing performance of a bit-testing procedure on plural elements stored in the source vector register to generate plural result bits, wherein the bit-testing procedure comprises for each processed element of the plural elements:

setting a respective result bit of the plural result bits in dependence on a value of a tested bit at a bit position in the processed element of the source vector register indicated by the index, wherein in the bit-testing procedure an element of the plural elements is subjected to the bit-testing procedure as the processed element when a respective predicate bit of a set of governing predicate bit values has a first predetermined value, and wherein in the bit-testing procedure, when the respective predicate bit of the set of governing predicate bit values does not have the first predetermined value, the respective result bit of the plural result bits is set to a second predetermined value.

17. A non-transitory computer-readable storage medium storing a computer program for controlling a host data processing apparatus to provide an instruction execution environment comprising:

instruction decoding program logic to decode instructions and generate control signals in dependence on the instructions; and data processing program logic to perform data processing operations in response to the control signals generated by the instruction decoding program logic, wherein the instruction decoding program logic is responsive to a bit-testing instruction specifying a source vector data structure and an index to cause the data processing program logic to:

perform a bit-testing procedure on plural elements stored in the source vector data structure to generate plural result bits, the bit-testing procedure comprising for each processed element of the plural elements:

setting a respective result bit of the plural result bits in dependence on a value of a tested bit at a bit position in the processed element of the source vector data structure indicated by the index, wherein in the bit-testing procedure an element of the plural elements is subjected to the bit-testing procedure as the processed element when a respective predicate bit of a set of governing predicate bit values has a first predetermined value, and wherein in the bit-testing procedure, when the respective predicate bit of the set of governing predicate bit values does not have the first predetermined value, the respective result bit of the plural result bits is set to a second predetermined value.

* * * * *